United States Patent
Kato et al.

(10) Patent No.: US 9,611,777 B2
(45) Date of Patent: Apr. 4, 2017

(54) EXHAUST DEVICE OF MULTI-CYLINDER ENGINE

(71) Applicant: Mazda Motor Corporation, Aki-gun, Hiroshima (JP)

(72) Inventors: Jiro Kato, Kure (JP); Tatsuya Koga, Higashihiroshima (JP); Shinji Sumi, Hiroshima (JP); Haruna Yanagida, Hiroshima (JP); Norihisa Murata, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/825,051

(22) Filed: Aug. 12, 2015

(65) Prior Publication Data

US 2016/0084139 A1  Mar. 24, 2016

(30) Foreign Application Priority Data

Sep. 24, 2014 (JP) ................ 2014-193663

(51) Int. Cl.
| | |
|---|---|
| *F01N 13/10* | (2010.01) |
| *F01N 3/20* | (2006.01) |
| *F01N 3/28* | (2006.01) |
| *F01N 13/14* | (2010.01) |

(52) U.S. Cl.
CPC ........... *F01N 13/10* (2013.01); *F01N 3/2066* (2013.01); *F01N 3/28* (2013.01); *F01N 13/141* (2013.01)

(58) Field of Classification Search
CPC ...... F01N 13/10; F01N 13/102; F01N 13/141; F01N 2470/18; F01N 2470/20; F01N 2470/22; F01N 13/004
See application file for complete search history.

(56) References Cited

U.S. PATENT DOCUMENTS

| | | | | |
|---|---|---|---|---|
| 2005/0241303 A1* | 11/2005 | Nording | ................ | F01N 13/102 60/323 |
| 2011/0126522 A1* | 6/2011 | Ushijima | .................. | F01N 3/10 60/282 |

FOREIGN PATENT DOCUMENTS

| | | | | |
|---|---|---|---|---|
| FR | 2918710 A1 * | 1/2009 | ............. | F01N 13/10 |
| JP | 201357255 A | 3/2013 | | |

OTHER PUBLICATIONS

Machine translation of FR2918710A1, accessed Aug. 5, 2016.*
Machine translation of JP2013057255A, accessed Aug. 5, 2016.*

* cited by examiner

*Primary Examiner* — Jonathan Matthias
(74) *Attorney, Agent, or Firm* — Alleman Hall McCoy Russell & Tuttle LLP (57) ABSTRACT

An exhaust device of a multi-cylinder engine which controls local introduction of exhaust gas to a catalyst device and a variation between cylinders of introduction positions of the exhaust gas to the catalyst device is provided. The exhaust device is arranged so that the cylinders extend in a vehicle width direction at a vehicle front part, and an exhaust line is arranged so as to extend rearward from a rear of the engine, wherein, in sequence from an upstream side of an exhaust gas flow, four independent exhaust pipes corresponding to the cylinders, collecting pipes which collect all independent exhaust pipes, and the catalyst device are provided. The single exhaust pipe includes two bending parts and a downstream part thereof is connected so that the exhaust gas is introduced from a direction that is diagonally lateral to an inlet part of the catalyst device.

12 Claims, 10 Drawing Sheets

EXHAUST DEVICE OF MULTI-CYLINDER ENGINE

FIELD OF THE INVENTION

The present invention relates to an exhaust device for a multi-cylinder engine.

BACKGROUND ART

A rear exhaust layout of the transverse engine, in which an engine is arranged so that cylinder lines extend in a vehicle width direction in an engine room of a vehicle front part and exhaust lines are arranged so as to extend rearward of the engine, is well known. In such an engine, as described in the Patent Document 1, in sequence from an upstream side of an exhaust gas flow, a plurality of independent exhaust pipes corresponding to the cylinders, a single exhaust pipe which has collected all independent exhaust pipes, and a catalyst device are provided, wherein the catalyst device is positioned as near as possible to the engine for a premature activation and an active condition maintenance.

RELATED ART

Patent Document

PATENT DOCUMENT 1 Japanese Unexamined Patent Application Publication No. 2013-57255 (Especially FIGS. 1 and 2)

SUMMARY OF THE INVENTION

Problems to be Solved by the Invention

Since the exhaust gas which has just been exhausted from the engine has a high flow rate and a strong directivity, if the catalyst device is close to the engine, the exhaust gas is locally introduced to the catalyst device in a state wherein diffusion is not increased. As a result, problems such as a monolithic carrier breaking due to heat or degradation in the purification performance of the catalyst device can occur. Moreover, in that case, if the introduction position of the exhaust gas to the catalyst device is different for each cylinder, problems may arise, such as that the detection result of an oxygen concentration sensor on the downstream of the catalyst device may vary and the unburned fuel exhausted from a misfired cylinder may remain adhered to the carrier for a long time.

Such problems can easily occur in the case of a pulse exhaust line wherein a flow rate of the exhaust gas is higher, such as is described in the Patent Document 1. A pulse exhaust line is an exhaust line configured so that the exhaust gas is flowed from an independent exhaust pipe into a single exhaust pipe at a high speed, and the negative pressure thereby sucks out the exhaust gas from other independent exhaust pipes.

The present invention deals with the above-described problems for a multi-cylinder engine and provides an exhaust device of the multi-cylinder engine that controls the local introduction of the exhaust gas to the catalyst device and also controls the variation between the cylinders of the introduction positions of the exhaust gas to the catalyst device.

Brief Summary of the Invention

In order to solve the above problems, the present invention provides an exhaust device of a multi-cylinder engine, wherein the engine is arranged so that the cylinder lines extend in a prescribed direction at a vehicle front part, and the exhaust line is arranged so as to extend rearward of the engine, wherein, in sequence from an upstream side of the exhaust gas flow, a plurality of independent exhaust pipes corresponding to the cylinders, a single exhaust pipe which has collected all of the independent exhaust pipes, and a catalyst device, are provided, and the single exhaust pipe includes two or more bending parts and the downstream part thereof is connected to an inlet part of the catalyst device so that the exhaust gas is introduced from a direction that is diagonally lateral to an inlet part of the catalyst device.

According to the present invention, the exhaust gas, which is flowed from the independent exhaust pipe into the single exhaust pipe, collides with an inner wall of the outer side of the bend in the single exhaust pipe and flows in contact with the inner wall of the outer side of the bend in the single exhaust pipe. Therefore, the exhaust gas is introduced to the catalyst device in a state of declined flow rate, weakened directivity, and increased diffusion. Moreover, since there are two or more bending parts, the length of the bending parts becomes long and the above-described effects are increased. Furthermore, since the exhaust gas is introduced to the catalyst device in a direction that is diagonal to the flow direction of the exhaust gas, the diffusion is further accelerated compared with the case of being introduced parallel to the flow direction of the exhaust gas.

Moreover, since the exhaust gas flows by being pushed to the inner wall of the outer side of the bend in the single exhaust pipe at the bending part of the single exhaust pipe, regardless of from which of the independent exhaust pipes the exhaust gas flows into the single exhaust pipe, the flow position in the single exhaust pipe is arranged to be nearly the same (the outer side of the bend). Furthermore, since there are two or more portions of the bending parts, the length of the bending parts becomes long and the above-described effects are increased.

As stated above, the exhaust device of the multi-cylinder engine, which controls the local introduction of the exhaust gas to the catalyst device and the variation between the cylinders of the introduction positions of the exhaust gas to the catalyst device, is provided.

According to the present invention, it is preferable that the sum total of bending angles of the bending parts is 180° or more.

According to this configuration, since the length of the bending parts is certainly lengthened, effects, such as that the exhaust gas is introduced to the catalyst device with increased diffusion and the flow position of the exhaust gas in the single exhaust pipe is arranged to be nearly the same, are certainly obtained, and therefore the local introduction of the exhaust gas to the catalyst device and the variation between the cylinders of the introduction positions of the exhaust gas to the catalyst device are certainly controlled.

According to the present invention, it is preferable that the single exhaust pipe is formed into a loop shape by forming the bending portions to include components which mutually bend toward the same side.

According to this configuration, since the outer side positions of the bends in the single exhaust pipe are restrained from drastically varying from each other, the exhaust gas does not move much along the inner walls of the single exhaust pipe when the bending parts are varied. Therefore, the effect of the flow position of the exhaust gas in the single exhaust pipe being arranged to be nearly the same, is further increased. Moreover, the single exhaust pipe can also be made compact.

Moreover, in order to solve the above-described problems, the present invention provides an exhaust device of a multi-cylinder engine wherein the engine is arranged so that the cylinder lines extend in a prescribed direction at a vehicle front part, and the exhaust line is arranged so as to extend rearward of the engine, wherein, in sequence from an upstream side of the exhaust gas flow, a plurality of independent exhaust pipes corresponding to the cylinders, a single exhaust pipe which has collected all independent exhaust pipes, and a catalyst device are provided, and the single exhaust pipe includes one portion of the bending part of which the bending angle is 180° or more, and the downstream part thereof is connected so that the exhaust gas is introduced from a direction that is diagonally lateral to an inlet part of the catalyst device.

According to the present invention, the exhaust gas, which is flowed from the independent exhaust pipe into the single exhaust pipe, collides with the inner wall on the outer side of the bend in the single exhaust pipe and flows in contact with the inner wall on the outer side of the bend in the single exhaust pipe. Therefore, the exhaust gas is introduced to the catalyst device in a state of declined flow rate, weakened directivity, and increased diffusion. Moreover, since the bending angle of the bending part is 180° or more, the length of the bending parts becomes long and the above-described effects are increased. Furthermore, since the exhaust gas is introduced to the catalyst device in a direction which is diagonal to the flow direction of the exhaust gas, compared with the case of being introduced parallel to the flow direction of the exhaust gas, the diffusion is further accelerated.

Moreover, since the exhaust gas flows by being pushed to the inner wall of the outer side of the bend in the single exhaust pipe at the bending part of the single exhaust pipe, regardless of which of the independent exhaust pipes the exhaust gas flows from to the single exhaust pipe, the flow position in the single exhaust pipe is arranged to be almost the same (the outer side of the bending). Moreover, since the bending angle of the bending part is 180° or more, the length of the bending parts becomes long and the above-described effects are increased.

As stated above, the exhaust device of the multi-cylinder engine, which controls the local introduction of the exhaust gas to the catalyst device and the variation between the cylinders of the introduction positions of the exhaust gas to the catalyst device, is provided.

In the present invention, a rear exhaust pipe extending toward the vehicle rear is also provided downstream of the catalyst device, and it is preferable to provide the catalyst device downward of the independent exhaust pipes, the single exhaust pipe at one side of the independent exhaust pipes and the catalyst device in a vehicle width direction, and the rear exhaust pipe at the other side thereof.

According to this configuration, the exhaust line can be compactly stored in a tunnel part of a floor panel. Moreover, since interference can be suppressed between the exhaust line in the tunnel part and a propeller shaft of a four-wheel drive vehicle by simply changing the rear exhaust pipe, the exhaust line can be easily adopted by a four-wheel drive vehicle.

In the present invention, a pulse exhaust line, of which the exhaust line is configured so that the exhaust gas is flowed from one of the independent exhaust pipes into the single exhaust pipe at a high speed, and the negative pressure generated thereby sucks out the exhaust gas from the other independent exhaust pipes, is preferable.

According to this configuration regarding the pulse exhaust line, of which the flow rate of the exhaust gas is faster and the local introduction of the exhaust gas to the catalyst device easily occurs, the local introduction of the exhaust gas to the catalyst device and the variation between the cylinders of the introduction positions of the exhaust gas to the catalyst device are effectively controlled.

In the present invention, it is preferable that at least a part of the independent exhaust pipes and the single exhaust pipe has a double pipe structure.

According to this configuration, even though the position of the catalyst device from the engine becomes more distant by lengthening the single exhaust pipe, a decrease in temperature of the exhaust gas being introduced to the catalyst device is suppressed, and the premature activation and the active condition maintenance of the catalyst device are ensured.

In the present invention, it is preferable that a heat insulating material is applied to at least a part of the independent exhaust pipes and the single exhaust pipe.

According to this configuration, even though the distance between the catalyst device and the engine is increased by lengthening the single exhaust pipe, the decrease in temperature of the exhaust gas being introduced to the catalyst device is suppressed, and the premature activation and active condition maintenance of the catalyst device are ensured.

Effects of the Invention

According to the present invention, the exhaust device of the multi-cylinder engine, which controls the local introduction of the exhaust gas to the catalyst device and the variation between the cylinders of the introduction positions of the exhaust gas to the catalyst device, is provided.

DETAILED DESCRIPTION OF THE EMBODIMENTS

Figure 1:
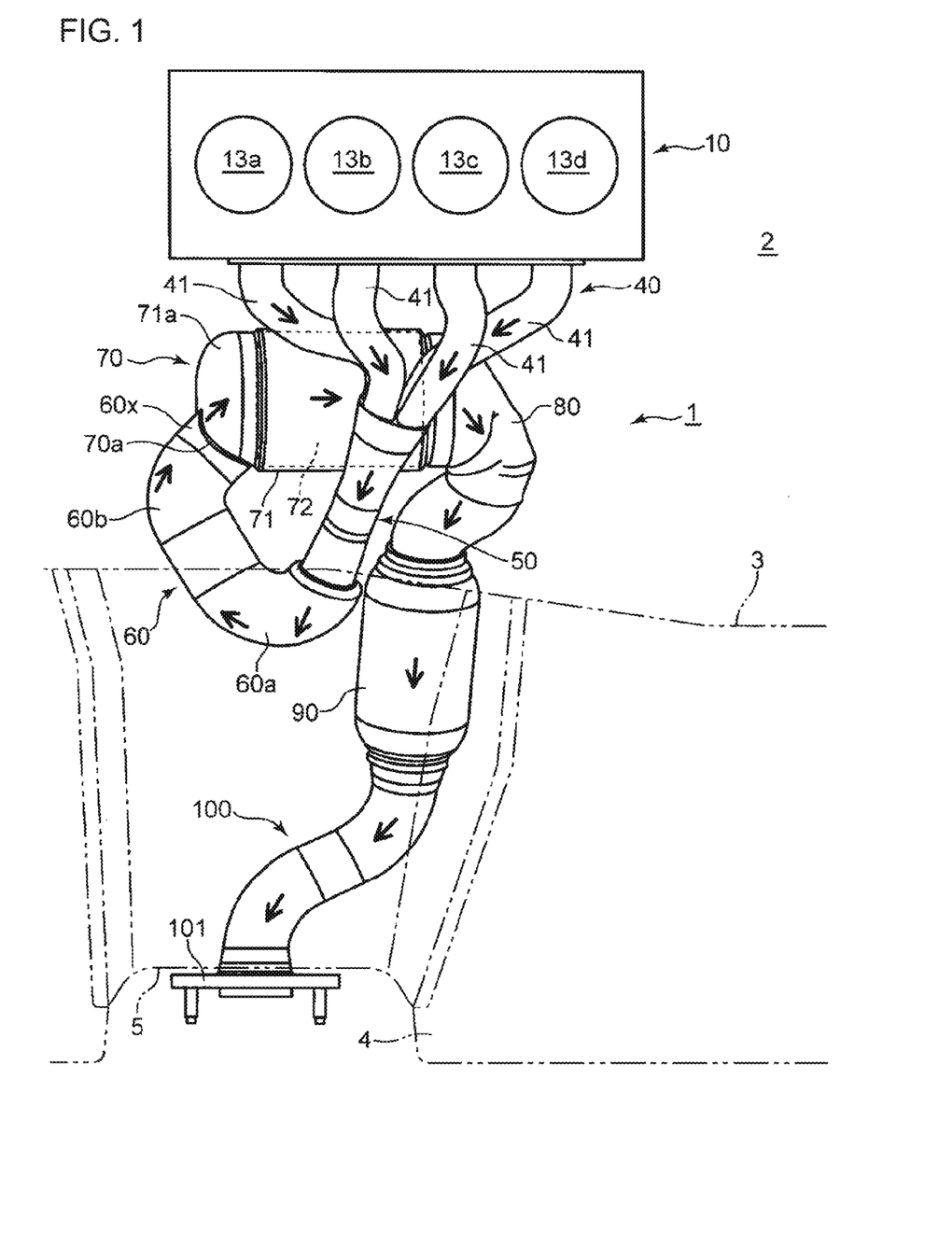
FIG. 1 shows a plan view of the exhaust device of the multi-cylinder engine according to the present invention.
Figure 2:
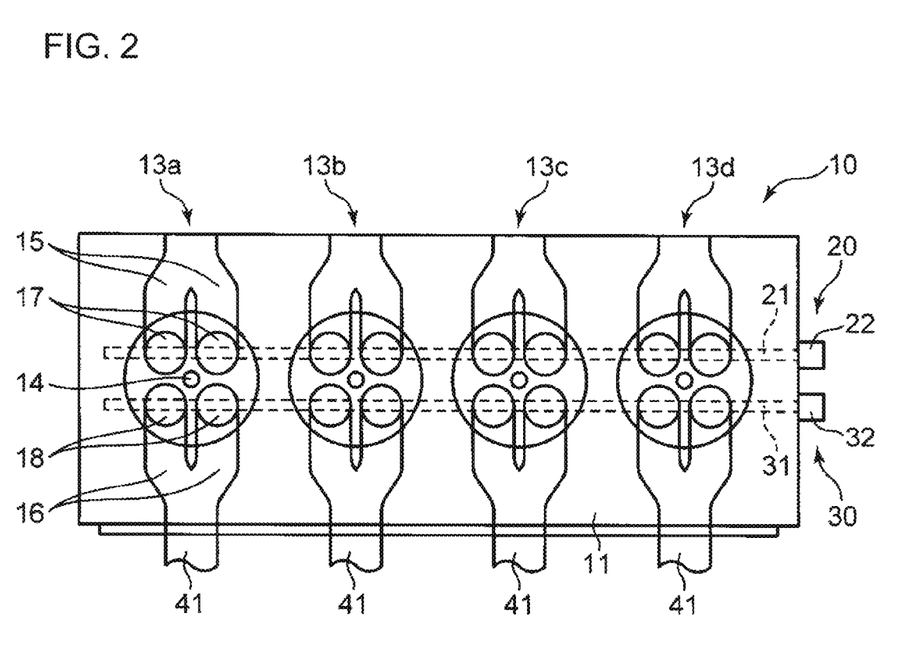
FIG. 2 shows a schematic plan view of a body part of the engine.
Figure 3:
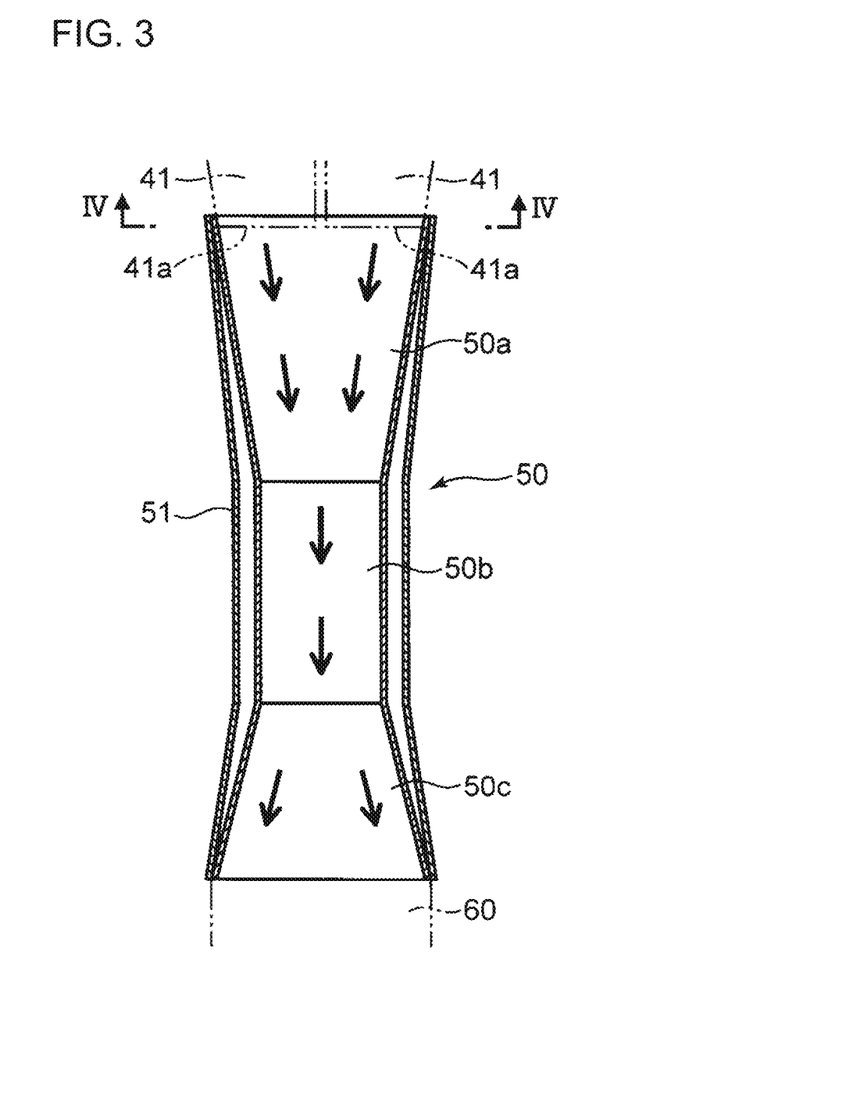
FIG. 3 shows a sectional view of the flow direction of the exhaust gas of the collecting pipe that is used for the exhaust device.
Figure 4:
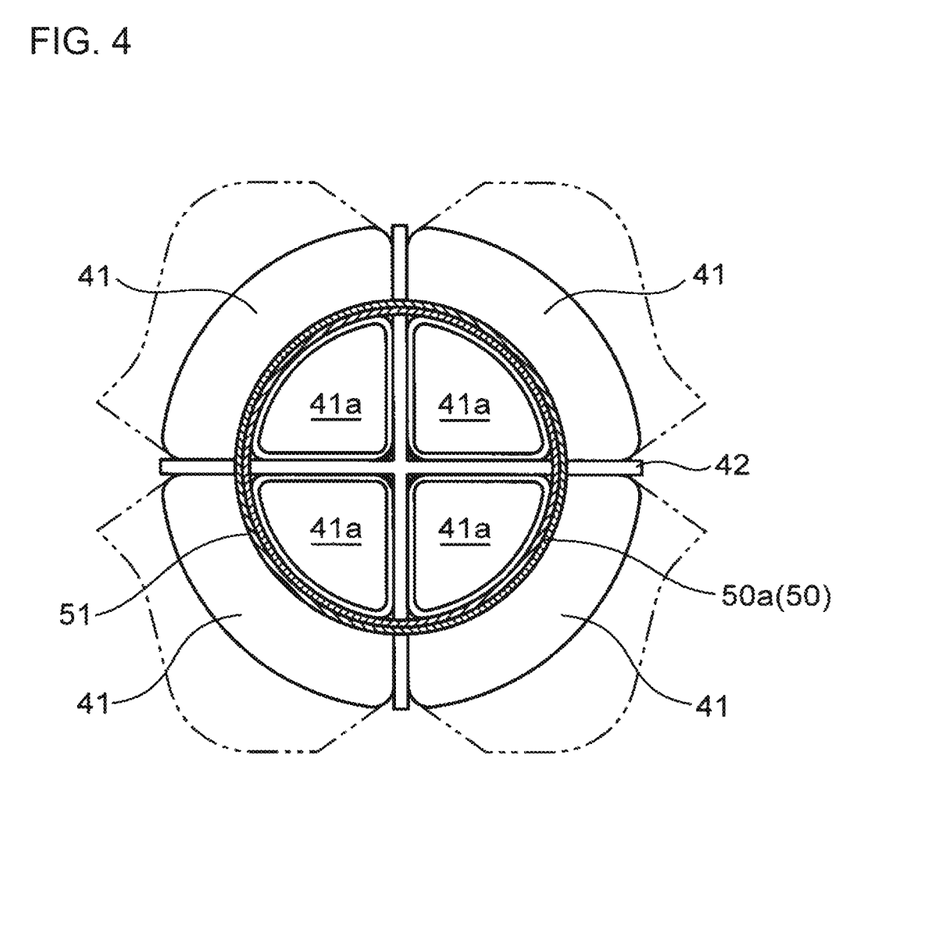
FIG. 4 shows a cross sectional view taken along a line IV-IV of FIG. 3.

FIG. 1 is a plan view of an exhaust device 1 of a multi-cylinder engine according to the present invention, FIG. 2 is a schematic plan view of a body part 10 (equivalent to an "engine" in the claims) of the engine, FIG. 3 is a sectional view of the flow direction of the exhaust gas of a collecting pipe 50 (equivalent to a "single exhaust pipe" in claims) that is used for the exhaust device 1, and FIG. 4 is a cross sectional view taken along a line IV-IV of FIG. 3.

Figure 5:
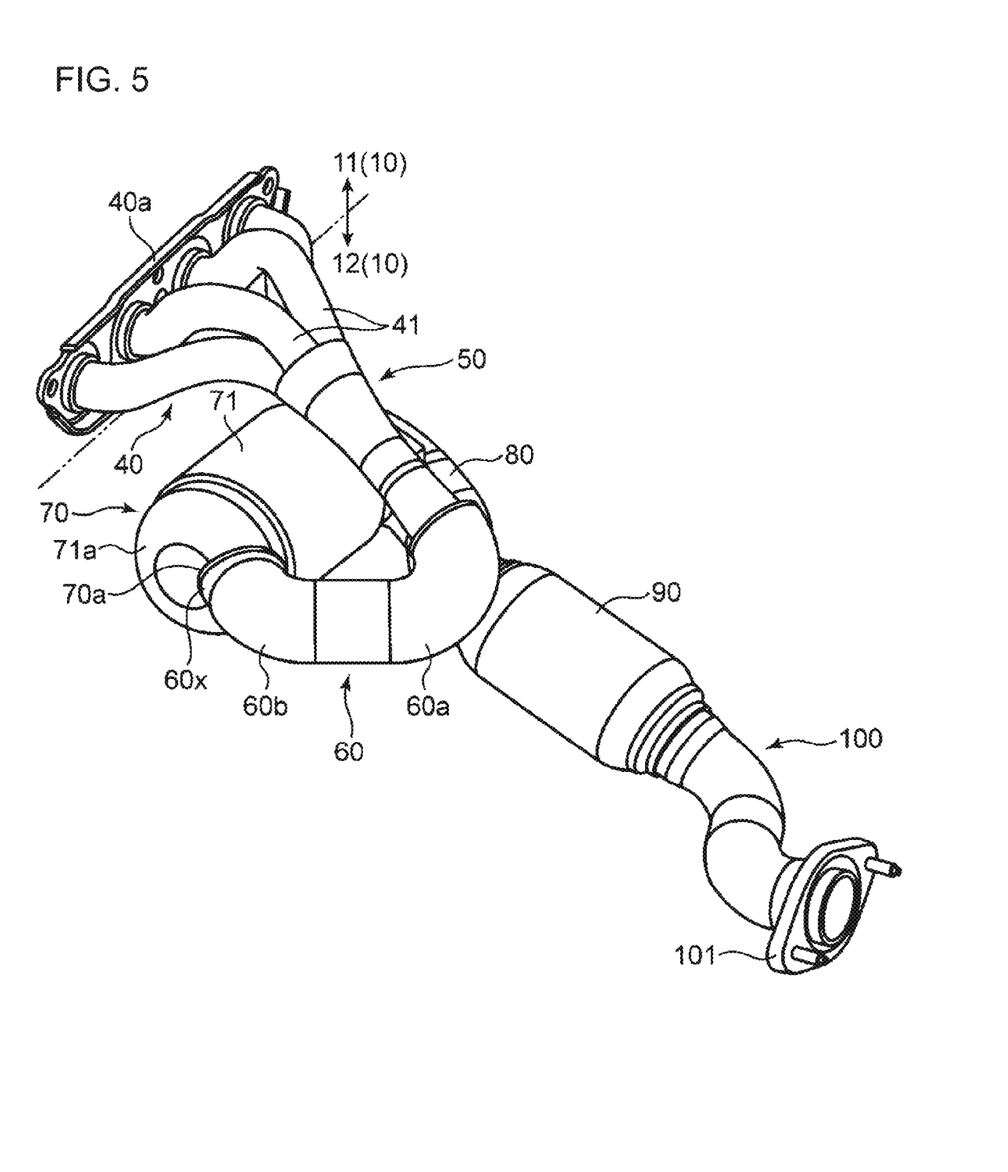
FIG. 5 shows a perspective view from the upper-left rear of the exhaust device of the multi-cylinder engine.
Figure 6:
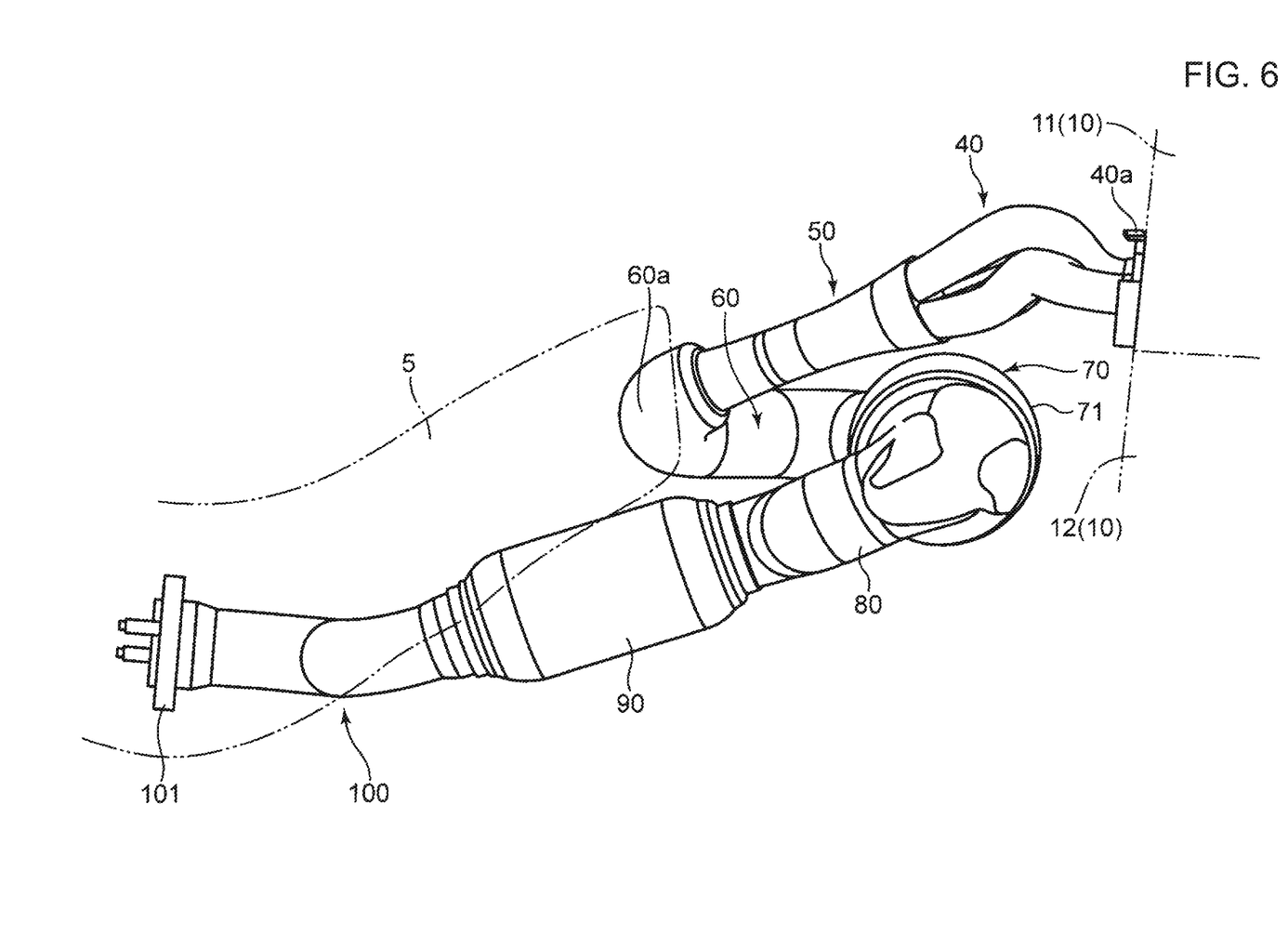
FIG. 6 similarly shows a right side elevated view.
Figure 7:
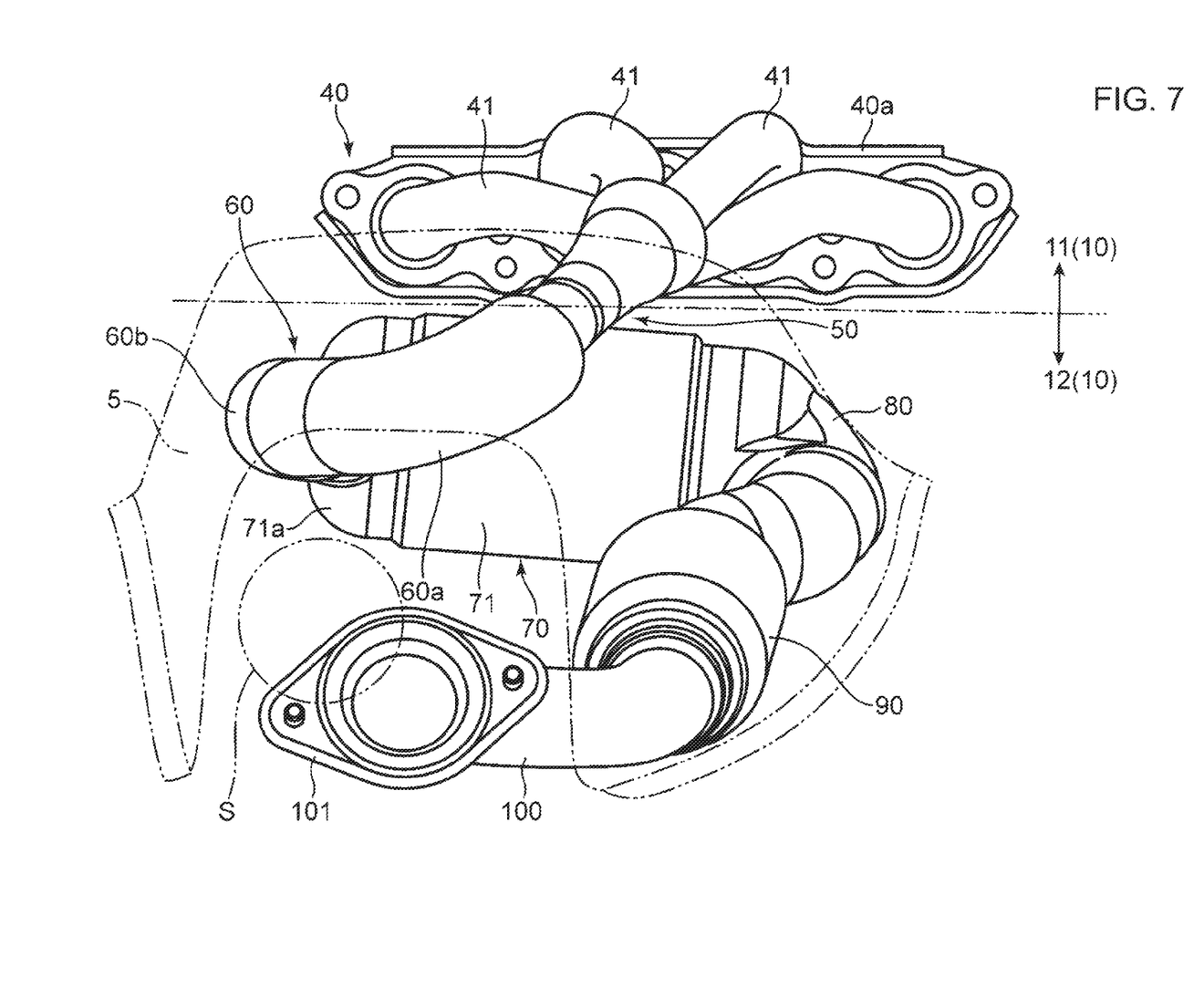
FIG. 7 similarly shows a rear elevated view.

As shown in FIG. 1, in sequence from an upstream side of the exhaust gas flow, the exhaust device 1 comprises the engine body part 10 having a cylinder head 11 and a cylinder block 12 (refer to FIGS. 5 to 7), an exhaust manifold 40 assembled to the engine body part 10, a collecting pipe 50 connected to the exhaust manifold 40, a loop pipe 60 (equivalent to the "single exhaust pipe" in the claims) connected to the collecting pipe 50, a catalyst device 70 connected to the loop pipe 60, a connecting pipe 80 connected to the catalyst device 70, a flexible exhaust pipe 90 connected to the connecting pipe 80, and a rear exhaust pipe 100 connected to the flexible exhaust pipe 90.

The engine body part 10 is an in-line four-cylinder four-cycle gasoline engine having first to fourth cylinders 13a to 13d, and a rear exhaust layout of a transverse engine that arranges cylinder lines of the cylinders 13a to 13d so as to extend in the vehicle width direction (the right and left direction of FIG. 1) in an engine room 2 of the vehicle front part and arranges an exhaust line so as to extend rearward from the rear of the engine body part 10 (downward in FIG. 1).

As shown in FIG. 2, a spark plug 14 is arranged in the cylinder head 11 so as to face the combustion chambers of the cylinders 13a to 13d, an intake port 15 and an exhaust port 16 opened to the combustion chamber, and an intake valve 17 and an exhaust valve 18 to open and close the intake port 15 and the exhaust port 16. The intake port 15 is for introducing the intake air to the cylinders 13a to 13d, the exhaust port 16 is for exhausting the exhaust gas from the cylinders 13a to 13d, the intake valve 17 and the exhaust valve 18 are for communicating with or shutting off the intake port 15 and the exhaust port 16, respectively.

In the present embodiment, each ignition is performed at the offset timing of 180° CA (Crank Angle) in sequence from the first cylinder 13a, the third cylinder 13c, the fourth cylinder 13d, to the second cylinder 13b, and in this order, each stroke of the air intake, the compression, the expansion, and the exhaust is performed at the offset timing of 180° CA.

The intake valve 17 opens and closes the intake port 15 at the prescribed timing by being driven by an intake valve drive mechanism 20. The exhaust valve 18 opens and closes the exhaust port 16 at the prescribed timing by being driven by an exhaust valve drive mechanism 30.

The intake valve drive mechanism 20 has an air intake camshaft 21 and an air intake variable valve timing (VVT) 22 that are connected with the intake valve 17. The air intake camshaft 21 is connected with a crankshaft (not shown) and drives the intake valve 17 to open and close by rotating with the rotation of the crankshaft. The air intake VVT 22 changes the opening valve timing and the closing valve timing of the intake valve 17 by maintaining the opening valve timing and the lift amount of the intake valve 17 to be constant by changing the phase difference between the crankshaft and the air intake camshaft 21.

The exhaust valve drive mechanism 30 has an exhaust camshaft 31 and an exhaust VVT 32 that are connected with the exhaust valve 18. The exhaust camshaft 31 is connected with the crankshaft and drives the exhaust valve 18 to open and close by rotating with the rotation of the crankshaft. The exhaust VVT 32 changes the opening valve timing and the closing valve timing of the exhaust valve 18 by maintaining the opening valve timing and the lift amount of the exhaust valve 18 to be constant by changing the phase difference between the crankshaft and the exhaust camshaft 31.

The exhaust manifold 40 includes an assembling flange 40a (refer to FIGS. 5 to 7) to the rear face of the cylinder head 11 and four independent exhaust pipes 41 corresponding to the cylinders 13a to 13d. The upstream end parts of the independent exhaust pipes 41 are connected with the exhaust ports 16 of the cylinders 13a to 13d, and extend toward the vehicle rear by curving from the rear face of the engine body part 10.

As shown in FIG. 3, in sequence from the upstream side, the collecting pipe 50 includes a collecting part 50a, of which the flow passage area becomes smaller at the downstream side, a straight part 50b that extends to the downstream side by maintaining the flow passage area at the downstream end part of the collecting part 50a, and a diffuser part 50c, of which the flow passage area becomes larger at the downstream side. The downstream end parts 41a of the independent exhaust pipes 41 are connected with the upstream end part of the collecting part 50a, and the upstream end part of the loop pipe 60 is connected with the downstream end part of the diffuser part 50c. The collecting pipe 50 is arranged so that the upstream side is tilted upward and the downstream side is tilted downward and leftward at the rear of the engine body part 10.

As shown in FIG. 4, the downstream end parts 41a of the independent exhaust pipes 41, of which the central angle is a 90° fan shape, are connected with the upstream end part of the collecting part 50a by being bundled so as to form a circle. The numerical reference 42 in the FIG. 4 shows a connecting plate inserted between the downstream end parts 41a to bundle the downstream end parts 41a of the independent exhaust pipes 41, and the numerical reference 51 in FIGS. 3 and 4 shows an outer pipe that covers the collecting pipe 50 to suppress the temperature reduction of the exhaust gas (in other words, keeping the exhaust gas warm). That is, the collecting pipe 50 is a double-tube structure.

As shown in FIG. 1, the independent exhaust pipes 41 extend toward the collecting pipe 50 toward the vehicle rear by curving from the exhaust ports 16 of the cylinders 13a to 13d, and the exhaust gas exhausted from the cylinders 13a to 13d flows into the collecting part 50a of the collecting pipe 50 through the independent exhaust pipes 41. Since the independent exhaust pipes 41 have a form such that the flow passage area becomes smaller at the downstream side, the exhaust gas flows from the downstream end parts 41a of the independent exhaust pipes 41 into the collecting part 50a at a high speed. Since the collecting part 50a has a form such that the flow passage area becomes smaller at the downstream side, the exhaust gas that flowed to the collecting part 50a flows to the downstream side while maintaining the high speed.

By opening the exhaust valve 18, the high speed blowdown gas being exhausted from the cylinders 13a to 13d to the independent exhaust pipes 41 flows into the collecting part 50a of the collecting pipe 50 with an increased flow rate. According to this, the negative pressure is generated in the collecting part 50a, and the exhaust gas is sucked out from the other independent exhaust pipes 41 by this negative pressure (ejector effect). That is, in the present embodiment, the exhaust line is a pulse exhaust line.

In the present embodiment, at least in the low speed high load range, the valve opening period of the exhaust valve 18 and the valve opening period of the intake valve 17 of the cylinders 13a to 13d are overlapped around the air intake top dead center, and the intake valve drive mechanism 20 and the exhaust valve drive mechanism 30 are controlled between the cylinders 13a to 13d of which the exhaust orders are continuous so that the exhaust valve 20 of the following cylinders 13a to 13d are opened in the overlap period of the foregoing cylinders 13a to 13d. Specifically, the exhaust valve 18 of the third cylinder 13c is opened in the overlap period between the exhaust valve 18 and the intake valve 17 of the first cylinder 13a, the exhaust valve 18 of the fourth cylinder 13d is opened in the overlap period between the exhaust valve 18 and the intake valve 17 of the third cylinder 13c, the exhaust valve 18 of the second cylinder 13b is opened in the overlap period between the exhaust valve 18 and the intake valve 17 of the fourth cylinder 13d, and the exhaust valve 18 of the first cylinder 13a is opened in the overlap period between the exhaust valve 18 and the intake valve 17 of the second cylinder 13b. Therefore, by the ejector effect, the scavenging of the cylinders 13a to 13d in the overlap period is accelerated.

As shown in FIG. 1, FIGS. 5 through 7, and FIG. 11, the loop pipe 60 connects the downstream end part of the collecting pipe 50 with the upstream end part of the catalyst device 70. The loop pipe 60 has a first bending part 60a and a second bending part 60b from the upstream side. A shaft center A in a section more upstream than the first bending part 60a (meaning the flow direction of the exhaust gas; the same applies hereinafter) is arranged such that the upstream side is tilted upward and the downstream side is tilted downward and leftward.

Figure 11:
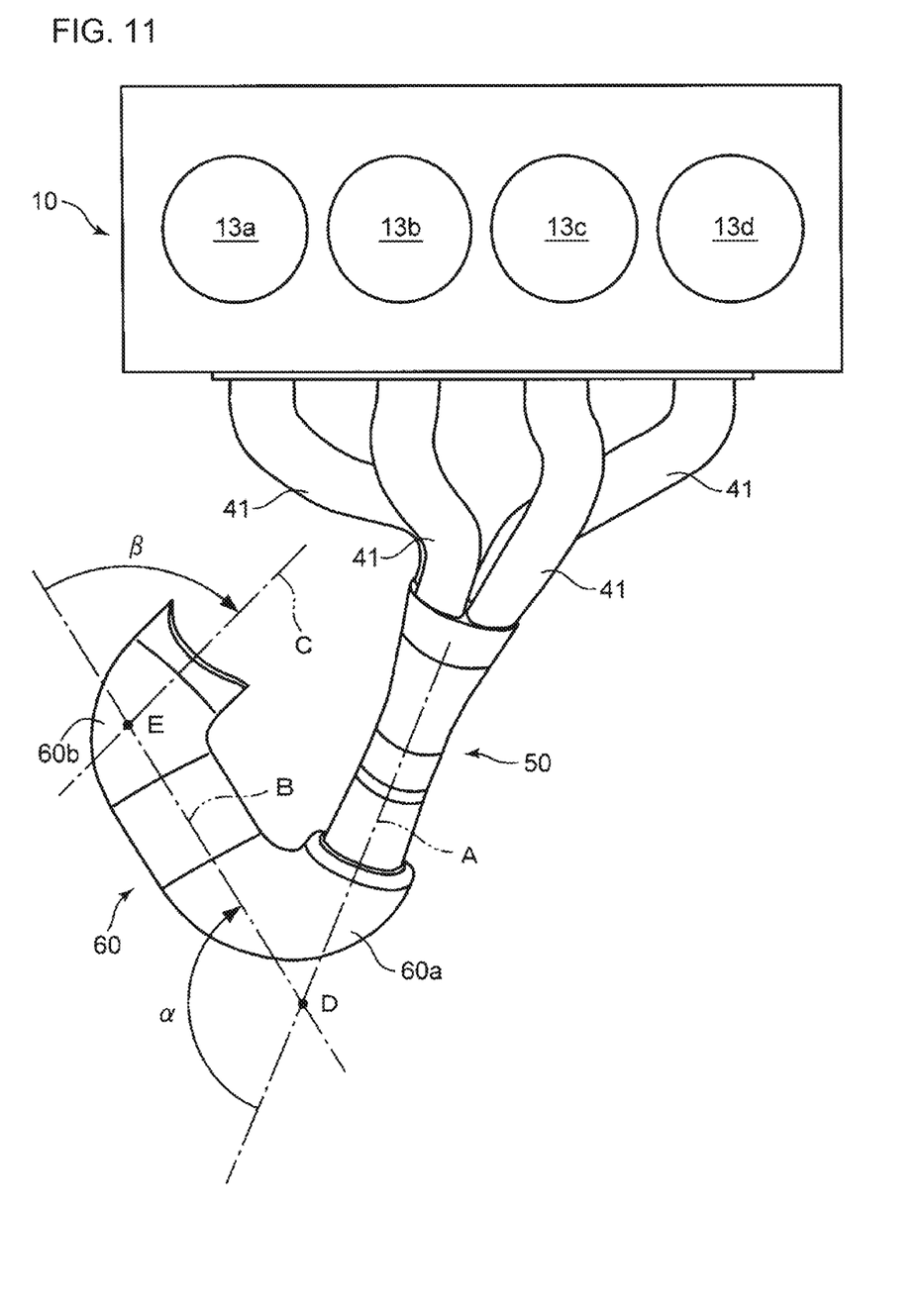
FIG. 11 shows a partial enlarged view of FIG. 1 in order to describe the bending angle according to the present embodiment.

A shaft center B in a section between the first bending part 60a and the second bending part 60b (meaning a section more downstream than the first bending part 60a or a section more upstream than the second bending part 60b) is arranged such that the downstream side is tilted forward and leftward in a nearly horizontal surface. A shaft center C in a section more downstream than the second bending part 60b is arranged such that the downstream side is tilted forward and rightward in the nearly horizontal surface.

The sum total of the bending angles of the bending parts 60a and 60b is 180° or more. In the present embodiment, the bending angle of the bending parts 60a and 60b means the bending angle when viewed from the central axis direction of the cylinders 13a to 13d (the vertical direction in the present embodiment), in other words, the bending angle (the bending angle shown in FIG. 1) appears when projecting from the central axis direction to a surface (the horizontal surface in the present embodiment) which is orthogonal to the cylinder central axis.

In FIG. 11, a numerical reference A is a shaft center in a section more upstream than the first bending part 60a when viewed from the cylinder central axis direction (the shaft center of the upstream end part of the loop pipe 60), a numerical reference B is a shaft center in a section more downstream than the first bending part 60a when viewed from the cylinder central axis direction (the shaft center of the middle part of the loop pipe 60), a numerical reference C is a shaft center in a section more downstream than the second bending part 60b when viewed from the cylinder central axis direction (the shaft center of the downstream end part of the loop pipe 60), a numerical reference D is an intersection point between the shaft centers A and B when viewed from the cylinder central axis direction, a numerical reference E is an intersection point between the shaft centers B and C when viewed from the cylinder central axis direction, a bending angle $\alpha$ of the first bending part 60a is the bending angle when viewed from the cylinder central axis direction, and a bending angle $\beta$ of the second bending part 60b is the bending angle when viewed from the cylinder central axis direction.

In the present embodiment, the bending angle $\alpha$ of the first bending part 60a is 125° and the bending angle $\beta$ of the second bending part 60b is 75°. That is, the sum total ($\alpha+\beta$) of the bending angles is 200°.

Although an upper limit of the sum total of the bending angles is not specifically limited, for example, about 360° is desirable. If the sum total of the bending angles is excessively large, the manufacturing cost of the loop pipe will be expensive. Moreover, it is possible that the flow rate of the exhaust gas will be excessively decreased.

In the present embodiment, the bending parts 60a and 60b include components which mutually bend toward the same side. That is, the bending direction of the first bending part 60a when viewed from the upstream side is the right side (clockwise rotation), and the bending direction of the second bending part 60b is also the right side (clockwise rotation) when viewed from the upstream side. According to this, the loop pipe 60 is formed into a loop shape, of which the downstream part 60x is close to the upstream part without being spaced apart.

A downstream part 60x of the loop pipe 60 is connected so that the exhaust gas is introduced from a direction that is diagonally lateral to an inlet part 70a of the catalyst device 70, more specifically, the exhaust gas is introduced from rearward and leftward to forward and diagonally rightward, diagonal to the shaft center of the catalyst device 70.

The catalyst device 70 includes a casing 71 that is nearly cylindrical shaped and extends horizontally in the flow direction of the exhaust gas, and a catalyst body (monolithic carrier) 72 having three-way catalyst functions that is stored in the casing 71. A prescribed space is formed on an upstream end part 71a of the casing 71, and the downstream part 60x of the loop pipe 60 is connected to the upstream end part 71a of the casing 71. At that time, the downstream part 60x of the loop pipe 60 is not connected horizontally to the shaft center of the catalyst device 70 and is connected parallel to the shaft center of the catalyst device 70.

The catalyst device 70 is transversely arranged at the rear of the independent exhaust pipes 41 and the collecting pipe 50 so that the upstream side faces leftward and the downstream side faces rightward in the nearly horizontal surface.

A connecting pipe 80 is arranged to the right of the catalyst device 70, the shaft center in the section of the upstream side is arranged such that the upstream side is tilted upward and the downstream side is tilted rearward and rightward, and the shaft center in the section of the downstream side is arranged such that the upstream side is tilted upward and the downstream side is tilted rearward and leftward.

An oxygen concentration sensor (not shown) is arranged to the connecting pipe 80. The oxygen concentration sensor is arranged downstream of the catalyst device 70 and detects the oxygen concentration of the exhaust gas passed through the catalyst device 70.

A flexible exhaust pipe 90 is for absorbing vibration from the vehicle body side and suppressing the transmission thereof to the exhaust line, and is arranged such that the upstream side is tilted upward and the downstream side is tilted rearward and leftward at the rearward of the connecting pipe 80, and stored in the tunnel part 5 of the floor panel 4.

A rear exhaust pipe 100 is arranged to the rear of the flexible exhaust pipe 90 and extends toward the vehicle rear by meandering a little to the left and right in the tunnel part 5 of the floor panel 4. The upstream side of the shaft center in the section of the upstream side of the rear exhaust pipe 100 is tilted upward. In FIG. 1, the numerical reference 3 is a dash panel inserted between an engine room 2 and a passenger compartment, and in FIG. 1 and FIGS. 5 through 7, the numerical reference 101 is a connecting plate for connecting the downstream side exhaust line components (not shown) to the rear exhaust pipe 100.

A shown in FIG. 1, the exhaust line arranged so as to extend rearward at the rear of the engine body part 10 is arranged to the rear of the engine body part 10 with four independent exhaust pipes 41 that extend from the rear face of the engine body part 10 toward the vehicle rear, and has the collecting pipe 50 where all four independent exhaust pipes 41 collect at the same time, the loop pipe 60 that is arranged to the left side part of the independent exhaust pipes 41 and the collecting pipe 50, the catalyst device 70 that is arranged to the right side part of the loop pipe 60 downward of the independent exhaust pipes 41 and the collecting pipe 50, the connecting pipe 80 that is arranged to the right side part of the independent exhaust pipes 41, collecting pipe 50, and the catalyst device 70, the flexible exhaust pipe 90 that is arranged to the rear of the connecting pipe 80, and the rear exhaust pipe 100 that is arranged to the rear of the flexible exhaust pipe 90. Therefore, as shown by arrows in FIG. 1, the exhaust gas that is exhausted from the cylinders 13a to 13d to the independent exhaust pipes 41, flows to the vehicle rear through the downstream side exhaust line components after flowing through the collecting pipe 50, the loop pipe 60, the catalyst device 70, the connecting pipe 80, the flexible exhaust pipe 90, and the rear exhaust pipe 100 turning rightward (clockwise rotation) in a plan view.

By the above configurations, the present embodiment obtains the following effects.

(1) The exhaust device 1 of the multi-cylinder engine with the engine body part 10 arranged so that the cylinders 13a to 13d extend in the vehicle width direction at the vehicle front part and the exhaust line arranged so as to extend to rearward at the rear of the engine body part 10, wherein, in sequence from the upstream side of the exhaust gas flow, the independent exhaust pipes 41 corresponding to the cylinders 13a to 13d, the collecting pipe 50 which has collected all the independent exhaust pipes 41 and the loop pipe 60, and the catalyst device 70 are provided, and since the loop pipe 60 includes two bending parts 60a and 60b and the downstream part 60x thereof is connected so that the exhaust gas is introduced from a direction that is diagonally lateral to the inlet part 70a of the catalyst device 70, the exhaust gas, which flowed from the independent exhaust pipes 41 into the collecting pipe 50 and the loop pipe 60, collides with the inner wall on the outer side of the bend of the loop pipe 60 and flows in contact with the inner wall on the outer side of the bends in the loop pipe 60 at the bending parts 60a and 60b of the loop pipe 60. Therefore, the exhaust gas is introduced to the catalyst device 70 in the state of a declined flow rate, weakened directivity, and increased diffusion. Moreover, since there are two bending parts 60a and 60b, the length of the bending parts 60a and 60b becomes long and the above-described effects are increased. Furthermore, since the exhaust gas is introduced to the catalyst device 70 in a direction diagonal to the flow direction (shaft center) of the exhaust gas, compared with the case of being introduced parallel to the flow direction of the exhaust gas, the diffusion is further accelerated.

Moreover, since the exhaust gas flows by being pushed to the inner wall of the outer side of the bend in the loop pipe 60 at the bending parts 60a and 60b of the loop pipe 60, whether or not the exhaust gas flowed from either the independent exhaust pipes 41 to the loop pipe 60, the flow position in the loop pipe 60 is arranged to be nearly the same (the outer side of the bending). Furthermore, since there are two bending parts 60a and 60b, the length of the bending parts 60a and 60b becomes long and the above-described effects are increased.

Figure 8:
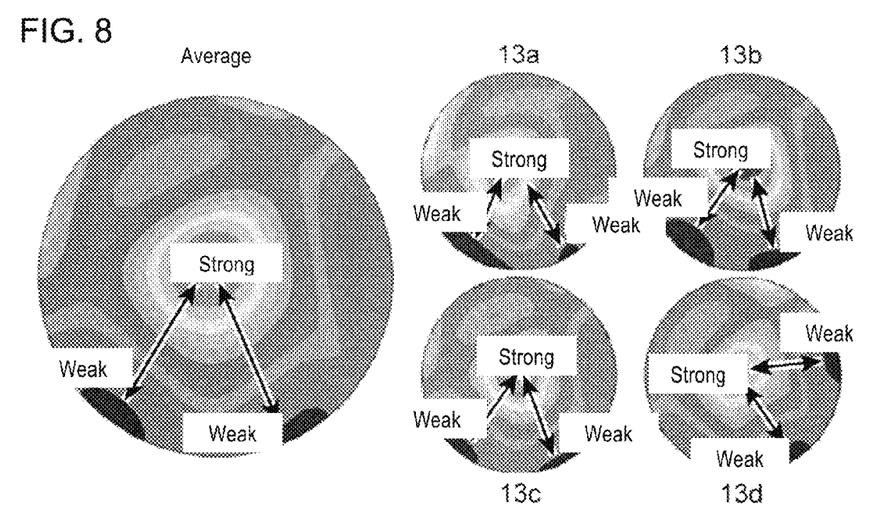
FIG. 8 shows a distribution diagram of the gas exposure of the exhaust gas to the catalyst body according to the present embodiment.

In FIG. 8 is a distribution diagram of the embodiment, which is of the gas exposure (flow rate) of the exhaust gas to the catalyst body 72 of the exhaust device 1 of the multi-cylinder engine related to the present embodiment. The gas exposure is evenly generated with increased dispersion to the catalyst body 72 and it is apparent that the local introduction of the exhaust gas to the catalyst device 70 is controlled. In addition, the gas exposure is generated from any of cylinders 13a to 13d in the same manner, and it is apparent that the variation between the cylinders 13a to 13d of the introduction positions of the exhaust gas to the catalyst device 70 is also controlled.

Figure 9:
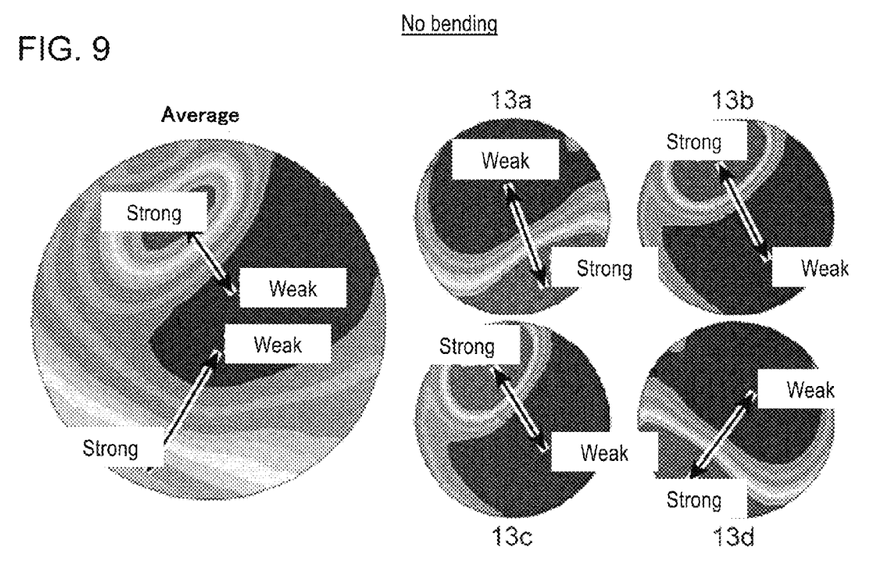
FIG. 9 shows the distribution diagram of the gas exposure before a countermeasure.

In contrast, FIG. 9 is a distribution diagram of a reference example, that is, of the gas exposure to the catalyst body of the exhaust gas when the catalyst device is directly connected with the collecting pipe without bending by not using the loop pipe. The gas exposure is generated locally to the catalyst body, so that problems such as a monolithic carrier breaking due to heat or the degradation in purification performance of the catalyst device occur. Moreover, the dispersion of the gas exposure between the cylinders is generated, so that problems arise such that the detection result of the oxygen concentration sensor downstream of the catalyst device may vary and the unburned fuel may remain adhered to the carrier for a long time.

Figure 10:
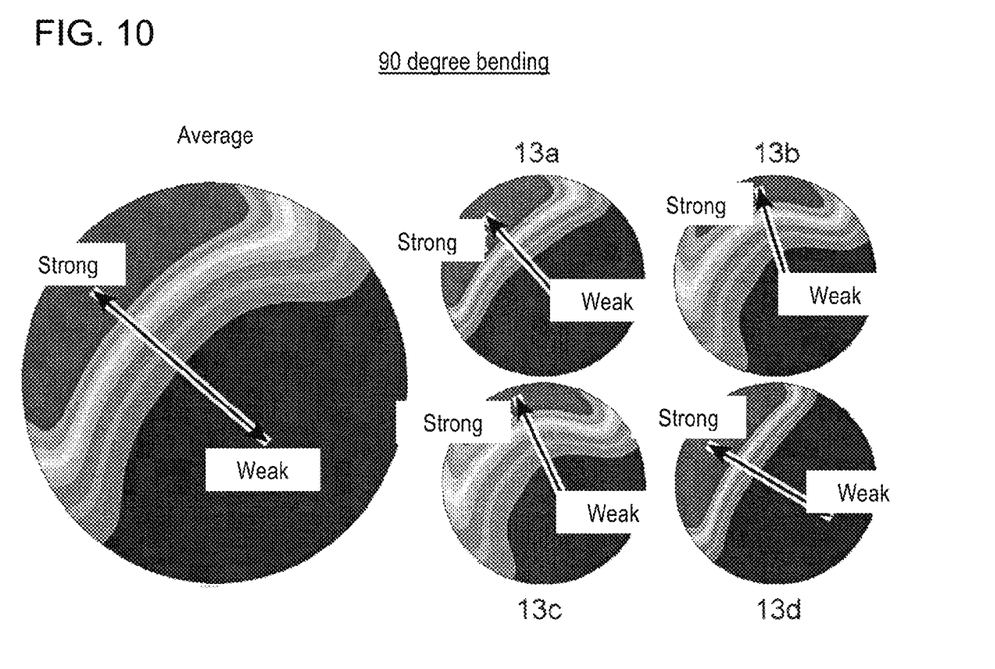
FIG. 10 shows the distribution diagram of the gas exposure of a comparative example.

Further, FIG. 10 is a distribution diagram of the exhaust gas to the catalyst body in a comparative example wherein the 90° bending is provided just once. While the dispersion of the gas exposure between the cylinders is controlled, the local gas exposure is still generated strongly.

As above, according to the present embodiment, the exhaust device 1 of the multi-cylinder engine, which controls the local introduction of the exhaust gas to the catalyst device 70 and also the variation of the introduction positions of the exhaust gas between the cylinders 13a to 13d to the catalyst device 70, is provided.

(2) As the sum total of the bending angles of the bending parts 60a and 60b is 180°, since the length of the bending parts 60a and 60b is certainly lengthened, effects are securely obtained, wherein the exhaust gas is introduced to the catalyst device 70 with increased diffusion, and the flow position of the exhaust gas in the single loop pipe 60 is arranged to be nearly the same, and hence the local introduction of the exhaust gas to the catalyst device 70 and the variation of the introduction positions of the exhaust gas between the cylinders 13a to 13d to the catalyst device 70 are certainly controlled.

(3) As the loop pipe 60 is formed into a loop shape by the bending parts 60a and 60b including bending components mutually on the same right side (clockwise rotation), since the outer side position of the bending of the loop pipe 60 is suppressed to be changed drastically between the bending parts 60a and 60b, the exhaust gas does not move largely on the inner wall of the loop pipe 60 when moving from the first bending part 60a to the second bending part 60b. Therefore, the effect, which the flow position of the exhaust gas in the loop pipe 60 is arranged to be nearly the same, is further increased. Moreover, the loop pipe 60 can be also made compact.

(4) Since a rear exhaust pipe 100 extending toward the vehicle rear at the downstream of the catalyst device 70 is provided, the catalyst device 70 is arranged at the downward of the independent exhaust pipes 41, the loop pipe 60 is arranged to the left side part of the independent exhaust pipes 41 and the catalyst device 70, and the rear exhaust pipe 100 is arranged to the right side part, the exhaust line can be compactly stored in the tunnel part 5 of the floor panel 4. Moreover, since interference in the tunnel part 5 can be suppressed between the exhaust line and a propeller shaft (refer to chain line S in FIG. 7) for such as a four-wheel drive vehicle or a FR (front engine•rear drive) vehicle by simply changing the rear exhaust pipe 100 to one which has less meandering, so that the exhaust line can be easily adopted to the four-wheel drive vehicle or the FR vehicle.

(5) Since the exhaust line is a pulse exhaust line configured so that the exhaust gas is flowed from the independent exhaust pipe 41 into the collecting pipe 50 at high speed and the negative pressure generated thereby sucks out the exhaust gas from the other independent exhaust pipes 41, regarding the pulse exhaust line, of which the flow rate of the exhaust gas is faster and the local introduction of the exhaust gas to the catalyst device 70 easily occurs, and the local introduction of the exhaust gas to the catalyst device 70 and the variation between the cylinders 13a to 13d of the introduction positions of the exhaust gas to the catalyst device 70 are effectively controlled.

(6) Since the collecting pipe 50 is a double pipe structure, even though the position of the catalyst device 70 from the engine body part 10 becomes more distant by lengthening the loop pipe 60, decreasing of the temperature of the exhaust gas being introduced to the catalyst device 70 is suppressed (in other words, keeping the exhaust gas warm) and the premature activation and the active condition maintenance of the catalyst device 70 are ensured.

In addition, in the embodiment, although the loop pipe 60 is bent twice, it is not limited as such and may be bent three or more times. Although the upper limit of bends is not specifically limited, for example, about ten times is preferable. Too many bends makes the manufacturing cost of the loop pipe become expensive. Moreover, it is possible that the flow rate of the exhaust gas is excessively decreased.

The sum total of the bending angles may be less than 180° as long as there are two or more bends. Although the lower limit of the sum total of bending angles is not specifically limited, for example, about 90° is preferable. If the sum total of the bending angles is excessively small, it is possible that the flow rate of the exhaust gas shall not be decreased so much.

The pipe may have one bending part, of which the bending angle is 180° or more. Again, although the upper limit of the bending angles is not specifically limited, for example, about 360° is preferable. If the bending angles are excessively large, the manufacturing cost of the loop pipe shall be expensive. Moreover, it is possible that the flow rate of the exhaust gas is excessively decreased.

The bending parts 60a and 60b do not necessary include bending components mutually to the same sides. For example, the first bending part 60a may be bent in the horizontal surface, and the second bending part 60b may be bent in the vertical surface. Alternatively, the first bending part 60a may be bent in the horizontal surface to the right when viewed from the upstream side, and the second bending part 60b may be bent in horizontal surface to the left when viewed from the upstream side.

In the embodiment, although the loop pipe 60 is bent in clockwise rotation, it may be bent in counterclockwise rotation.

In the embodiment, although the collecting pipe 50 is a double-tube structure to keep the exhaust gas warm, instead of it or along with it, a heat insulating material may be applied to the external surface of the collecting pipe 50. Moreover, not only the collecting pipe 50, but also the loop pipe 60 or the independent exhaust pipe 41 may have a double-tube structure or the heat insulating material may apply to them.

In the embodiment, although the exhaust line is the pulse exhaust line, it is not limited as such, and the present invention is favorably applicable to the ordinary exhaust line.

In the embodiment, although the engine is transversely mounted, it is not limited as such, and the present invention is favorably applicable to the longitudinal engine that is adopted to the FR vehicle, for example. A rear exhaust layout of transverse engine does not matter, and the engine which is arranged so that the cylinder lines extend in the vehicle longitudinal direction at the vehicle front part and the exhaust line which is arranged so as to extend rearward of the engine.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

EXPLANATION OF REFERENCE CHARACTERS

1 Exhaust device of a multi-cylinder engine
5 Tunnel part
10 Engine body part (Engine)
13a to 13d First to fourth cylinders
16 Exhaust port
18 Exhaust valve
40 Exhaust manifold
41 Independent exhaust pipe
41a Downstream end part of independent exhaust pipe
50 Collecting pipe (Single exhaust pipe)
51 Outer pipe
60 Loop pipe (Single exhaust pipe)
60a, 60b First and second bending parts
60x Downstream part of loop pipe
70 Catalyst device
70a Inlet part of catalyst device
71 Casing
71a Upstream end part of casing
72 Catalyst body (Monolithic carrier)
100 Rear exhaust pipe

We claim:

1. An exhaust device of a multi-cylinder engine that is arranged so that cylinder lines extend in a prescribed direction at a vehicle front part, and an exhaust line is arranged so as to extend rearward of the engine, comprising:
in sequence from an upstream side of an exhaust gas flow,
a plurality of independent exhaust pipes corresponding to the cylinders;
a single exhaust pipe which has collected all independent exhaust pipes; and
a catalyst device with a first longitudinal axis,
wherein the single exhaust pipe further comprises a first collecting part configured with a flow area that becomes smaller toward a downstream direction, a second collecting part provided downstream of the first collecting part and configured with a flow area that becomes larger toward the downstream direction, two or more bending parts provided downstream of the second collecting part, and a downstream part with a second longitudinal axis and provided downstream of the two or more bending parts, wherein the downstream part is connected to the catalyst device so that the first longitudinal axis is configured diagonally to the second longitudinal axis, and the exhaust gas is introduced into the catalyst device from a direction that is diagonally lateral to an inlet part of the catalyst device;

wherein all independent exhaust pipes directly converge together at one inlet of the single exhaust pipe; and wherein all exhaust gas flows from the one inlet through the single exhaust pipe into the inlet part of the catalyst device in a flow pathway without any flow diversions between the one inlet and the inlet part of the catalyst device.

2. The exhaust device of a multi-cylinder engine according to claim 1, wherein a sum total of bending angles of the bending parts is 180° or more.

3. The exhaust device of a multi-cylinder engine according to claim 1, wherein the single exhaust pipe is formed into a loop shape by the bending parts including bending components mutually on the same side.

4. The exhaust device of a multi-cylinder engine according to claim 1, wherein a rear exhaust pipe extending toward a vehicle rear is also provided downstream of the catalyst device, the catalyst device is provided downstream of the independent exhaust pipes, the single exhaust pipe is provided at one side of the independent exhaust pipes and the catalyst device in a vehicle width direction, and the rear exhaust pipe is provided at the other side thereof.

5. The exhaust device of a multi-cylinder engine according to claim 1, wherein the exhaust line is a pulse exhaust line with an exhaust valve configured so that the exhaust gas is flowed from one of the independent exhaust pipes into the single exhaust pipe at a high speed and the negative pressure generated thereby sucks out the exhaust gas from the other independent exhaust pipes.

6. The exhaust device of a multi-cylinder engine according to claim 1, wherein at least a part of the independent exhaust pipes and the single exhaust pipe is a double pipe structure.

7. The exhaust device of a multi-cylinder engine according to claim 1, wherein a heat insulating material is applied to at least a part of the independent exhaust pipes and the single exhaust pipe.

8. An exhaust device of a multi-cylinder engine that is arranged so that cylinder lines extend in a prescribed direction at a vehicle front part, and an exhaust line is arranged so as to extend rearward of the engine, comprising:

in sequence from an upstream side of an exhaust gas flow,
a single exhaust pipe with one inlet;
a plurality of independent exhaust pipes corresponding to the cylinders, the plurality of independent exhaust pipes all directly converging together at the one inlet of the single exhaust pipe; and
a catalyst device, wherein the single exhaust pipe further comprises a first collecting part configured with a flow area that becomes smaller toward a downstream direction, a second collecting part provided downstream of the first collecting part and configured with a flow area that becomes larger toward the downstream direction, at least one bending part with a bending angle of 180° or more and provided downstream of the second collecting part, and a downstream part provided downstream of the at least one bending part;

wherein the downstream part is connected so that the exhaust gas is introduced into the catalyst device from a direction that is diagonally lateral to an inlet part of the catalyst device; and wherein all exhaust gas flows from the one inlet through the single exhaust pipe into the inlet part of the catalyst device in a flow pathway without any flow diversions between the one inlet and the inlet part of the catalyst device.

9. The exhaust device of a multi-cylinder engine according to claim 8, wherein a rear exhaust pipe extending toward a vehicle rear is also provided downstream of the catalyst device, the catalyst device is provided downstream of the independent exhaust pipes, the single exhaust pipe is provided at one side of the independent exhaust pipes and the catalyst device in a vehicle width direction, and the rear exhaust pipe is provided at the other side thereof.

10. The exhaust device of a multi-cylinder engine according to claim 8, wherein the exhaust line is a pulse exhaust line with an exhaust valve configured so that the exhaust gas is flowed from one of the independent exhaust pipes into the single exhaust pipe at a high speed and the negative pressure generated thereby sucks out the exhaust gas from the other independent exhaust pipes.

11. The exhaust device of a multi-cylinder engine according to claim 8, wherein at least a part of the independent exhaust pipes and the single exhaust pipe is a double pipe structure.

12. The exhaust device of a multi-cylinder engine according to claim 8, wherein a heat insulating material is applied to at least a part of the independent exhaust pipes and the single exhaust pipe.

* * * * *